April 2, 1940.  W. S. SHAW  2,196,035
PORTABLE HEATING AND COOLING CABINET
Filed Jan. 24, 1938  3 Sheets-Sheet 1

Inventor
William S. Shaw
By Linnamee and Van Antwerp
Attorneys

Inventor
William S. Shaw
By [signature]
Attorneys

April 2, 1940.   W. S. SHAW   2,196,035
PORTABLE HEATING AND COOLING CABINET
Filed Jan. 24, 1938   3 Sheets-Sheet 3

Inventor
William S. Shaw
Attorneys

Patented Apr. 2, 1940

2,196,035

UNITED STATES PATENT OFFICE 2,196,035

PORTABLE HEATING AND COOLING CABINET

William S. Shaw, Chicago, Ill.

Application January 24, 1938, Serial No. 186,676

4 Claims. (Cl. 219—19)

This invention relates to a portable cabinet and more particularly to a type of cabinet which is adapted to be movable on wheels and to keep food warm.

The principal object of my invention is to provide a cabinet which may either be heated in order to keep food, or similar articles, warm, or which may be utilized, by the application of certain accessories thereto, to cool the atmosphere in a room.

Another object of my invention is to provide a cabinet having its height divided into a plurality of compartments and having heating elements therein to keep food or other articles warm which may be placed in any of the compartments or on the top thereof.

A still further and more particular object is to provide heating elements in said cabinet which may be operated either by electricity or in which heated soap-stones may be placed to provide the necessary warmth.

Still another object is to provide a cabinet wherein the heating elements may be removed and cooling means inserted in their place for the purpose of lowering the temperature of the surrounding atmosphere.

Other objects of my invention will appear as the description proceeds.

To the accomplishment of the foregoing and related ends said invention, then, consists of the means hereinafter fully described and particularly pointed out in the claims.

The annexed drawings and following description set forth in detail certain means embodying my invention, said means constituting, however, but a few of the various ways in which the principle of my invention may be used.

In said annexed drawings, wherein like reference characters refer to like parts in the various figures.

In general, the exact external structure of the cabinet may be used for either phase of my invention. That is, the same cabinet is used either for heating or cooling.

When food has been prepared in the kitchen, my invention may be utilized to transfer the entire meal to the dining room, where the cabinet may be placed near the table and the various courses served without returning to the kitchen.

It will be noted, in general, that the bottom shelf may be used for meats; vegetables and such may be placed on the middle shelf, while the top shelf may be used for warming plates. The cabinet is so designed that a single plug may be utilized to heat all of the heating units in both the bottom and center shelves.

By providing heating units of the character shown, namely, shallow plates secured to the bottom of the various shelves, the electric heating elements may be removed, where electricity is not available, and hot soap-stones placed therein with the same result.

Directing attention now generally to the other phase of my invention, namely, that of cooling the surrounding atmosphere, the shelves or partitions whereon the electric heating units are secured, must first be removed. In the upper compartment a basket, or similar container, may be supported and ice placed therein. In the lower compartment is then inserted a plurality of baffle plates having a fan attached thereto in order that air may be directed upwardly between said plates and through the ice. The air will then pass upwardly through openings in the top member and cool the surrounding atmosphere.

Figure 1:
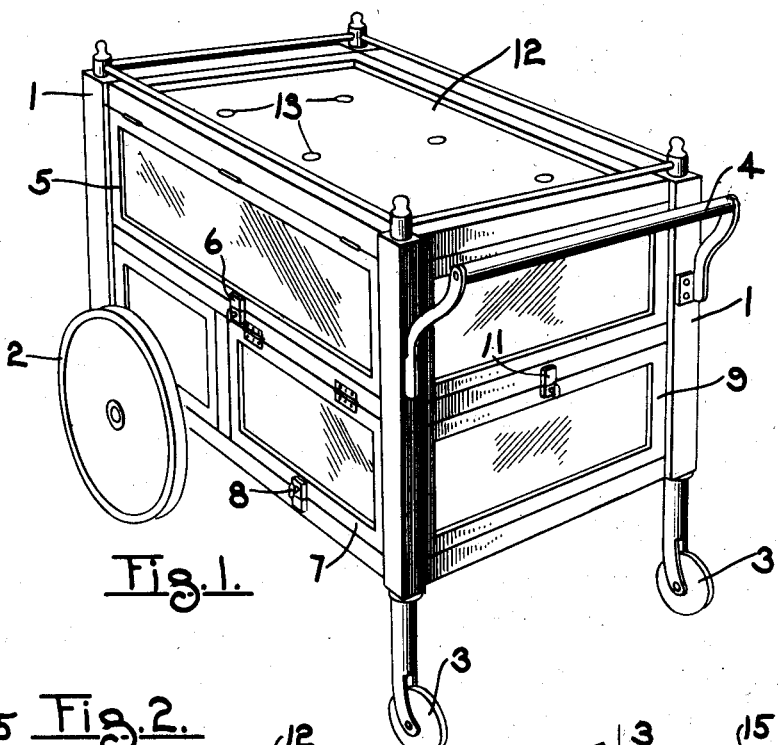
Fig. 1 is a perspective view of my portable cabinet.
Figure 2:
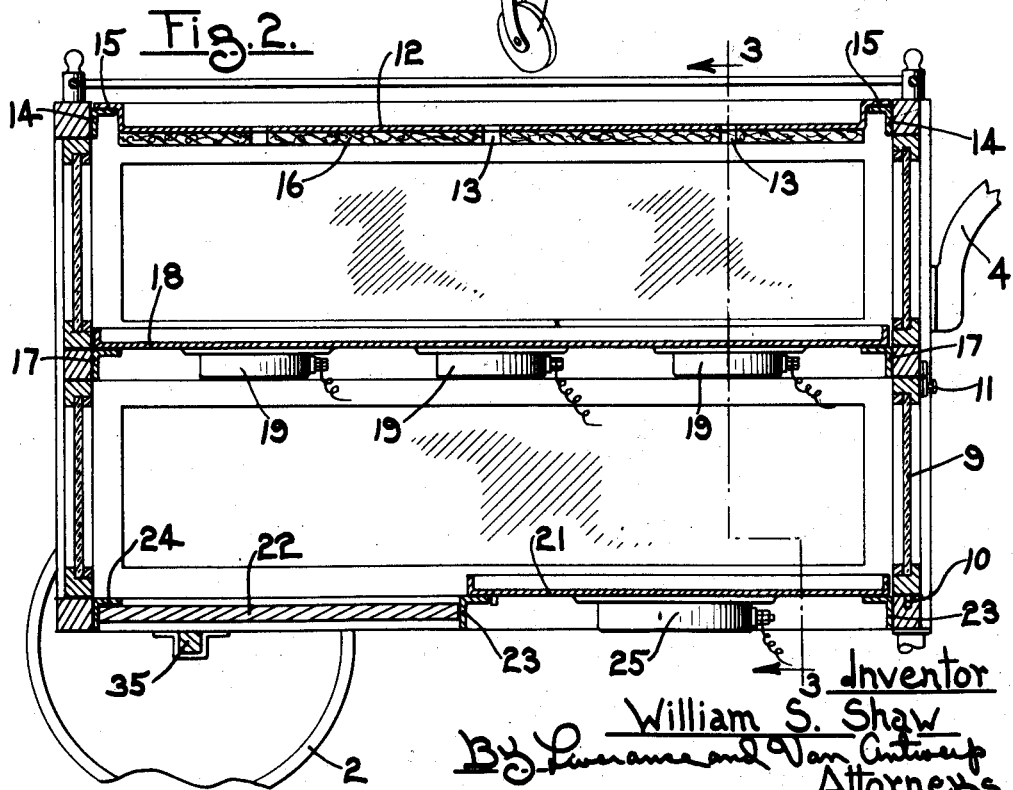
Fig. 2 is a vertical section taken longitudinally of the cabinet showing the heating units in elevation.
Figure 3:
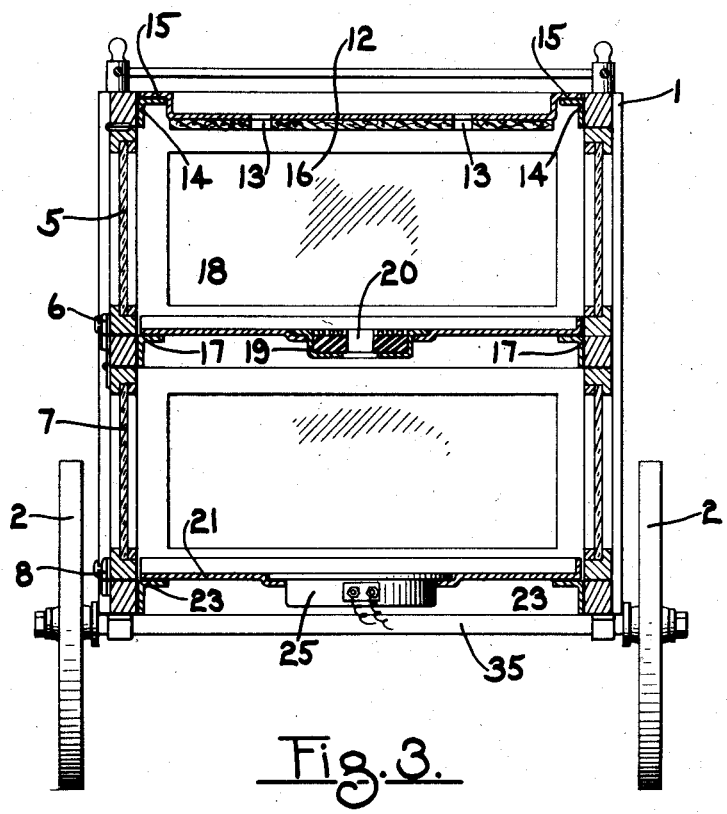
Fig. 3 is a part sectional, part elevational view taken laterally through the structure of Fig. 1.

Referring now more particularly to Figs. 1, 2 and 3, it will be noted that the cabinet is comprised of four corner posts, denoted by the numeral 1, having comparatively large wheels 2 at one end of the cabinet and smaller wheels 3 at the opposite end. The cabinet is intended to be guided by means of the handle 4.

The enclosing sides are preferably made up of art glass. One of said sides is provided with a door 5 which may be lifted upwardly in the usual manner to an open position and secured in a closed position by means of the latch 6. If so desired this door may be so constructed as to simulate the doors of a book case, that is to say, they may be designed to be raised and forced rearwardly into the cabinet, without departing in any way from the spirit of my invention. This upper door will allow easy access to the interior of the upper compartment of the cabinet.

Immediately below the door 5 is a smaller door 7, which may be raised in a similar manner and is secured in a closed position by means of the locking member 8. This smaller door is to provide easy access to the interior of the lower compartment of the cabinet.

In view of the fact that the above mentioned baffle plates extend the full length of the cabinet, a member 9 is detachably secured to the lower portion of the cabinet at one end thereof, by means of small pins 10 and the latch member 11. The removal of this member will allow the insertion of the baffle plates lengthwise into the lower compartment of the cabinet.

The top member 12 contains a plurality of openings therein, denoted by the numeral 13. The same top may be used in the process of either heating or cooling, and the openings are necessary to allow escape of either the warm air or the cool air.

Extending in a horizontal plane, about the inner side of the enclosing side members and near the top thereof, is a ledge or flange 14. A flange 15 is also provided around the top member 12 so that the flange 14 may act as a support for said top member. The top member is also insulated against heat as shown at 16.

At approximately half way down from the top is a second ledge or flange 17 which also extends in a horizontal plane and provides a support for the tray or shelf 18 which divides the cabinet into upper and lower compartments. To the bottom of the tray 18 is secured a plurality of metal plates 19 wherein the electric heating elements or the heated soap-stones may be placed. The tray 18 also contains a plurality of openings 20 directly over the heating units 19 so that the heat therein may be allowed to pass upwardly through said openings and into the upper compartment.

The lower shelf or tray 21 may extend the full length of the cabinet if so desired but it is shown in Fig. 2 as extending only a part of the distance across the bottom so that it may be removed by opening the door 7. When the short form of lower tray is used it will be necessary to provide an additional bottom member 22 in order to enclose the remaining portion of the cabinet. A third ledge 23 is provided, similar to the other ledges, near the bottom of the cabinet for the purpose of supporting the shelf 21. This flange 23 also acts as a support, in conjunction with the flange 24, for the bottom member 22. One or more heating elements 25 may also be secured to the tray 21 for the purpose above described. For every such heating element 25 secured to the lowermost tray is provided openings similar to those denoted by the numeral 20, for the purpose of allowing the heat to pass upwardly therethrough and into the lower compartment.

From the above description it will be seen that any food or other articles placed on the lowermost tray 21 will be kept warm by the action of the heating unit 25. Part of the heat from this element will also pass upwardly to heat the entire lower compartment. Furthermore, any food placed in the upper compartment will be kept warm by the action of the heating units 19. The heat from these elements will not only keep the articles placed therein in a heated condition but will also pass upwardly through the openings 13 to keep warm any articles which may be placed over those openings on the top member 12.

The food so placed in the various compartments may be allowed to remain there until ready for use or may be moved upwardly to the upper compartment and then to the top member as the various courses are served.

Figure 4:
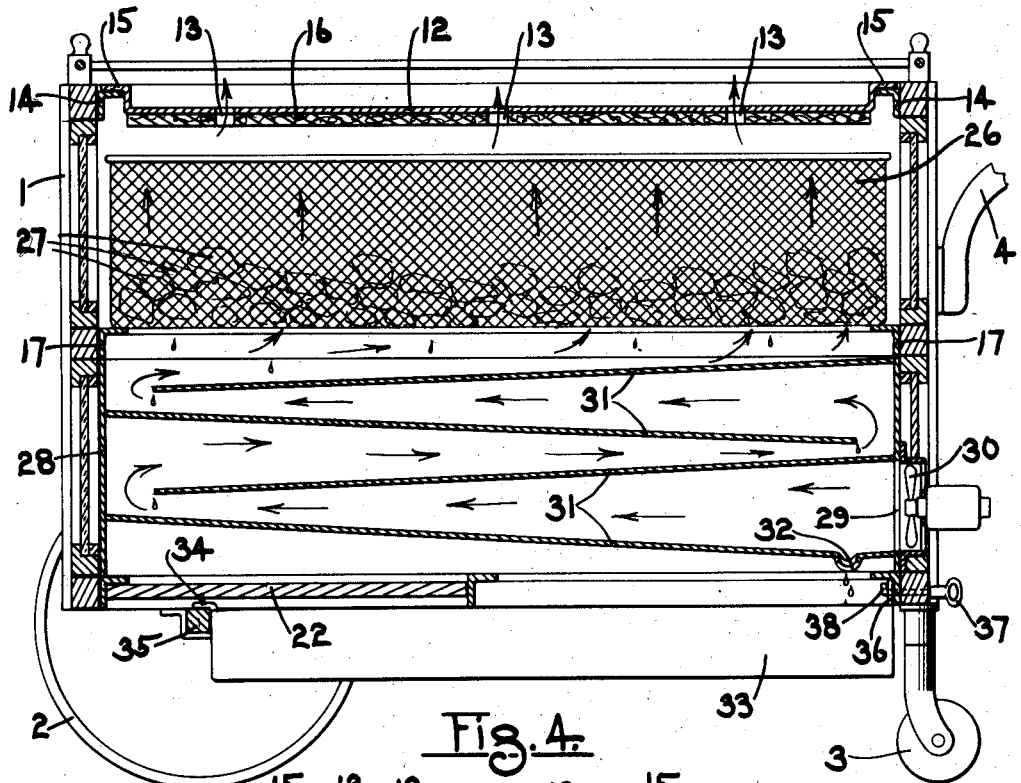
Fig. 4 is a sectional view taken on a plane lengthwise of the cabinet showing another phase of my invention wherein the heating elements have been removed and the cooling means inserted in their stead.
Figure 5:
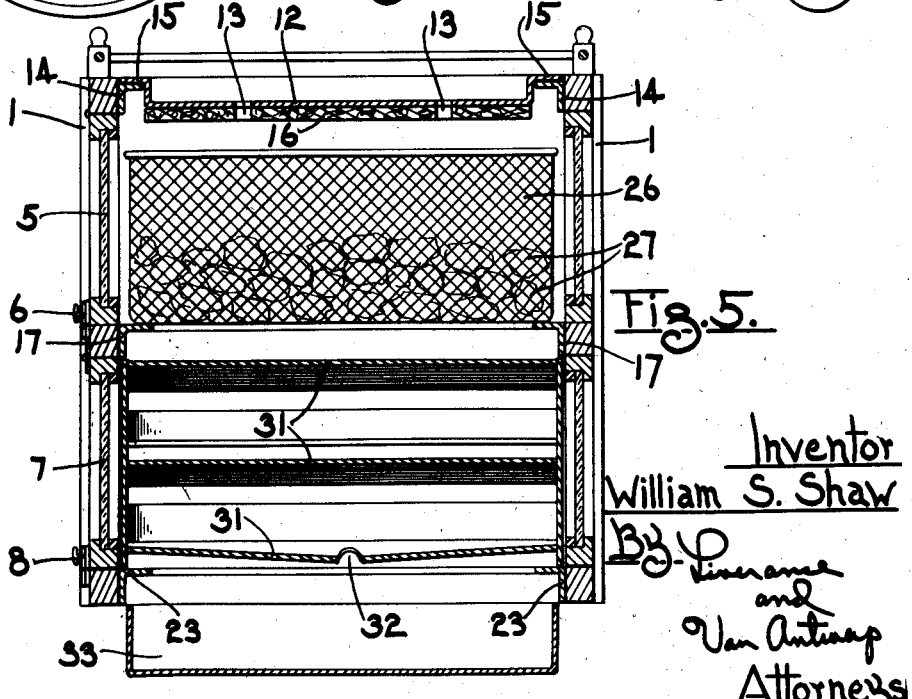
Fig. 5 is a lateral section of the structure shown in Fig. 4.

The second phase of my invention is denoted specifically in Figs. 4 and 5, is intended for use on warm days and may be utilized immediately after a meal by the mere removal of the trays 18 and 21 and the insertion in their place of the various cooling elements which will presently be described.

As above stated, the identical cabinet and top member may be used in this phase of my invention. After the trays 18 and 21 have been removed the basket or container 26 may be inserted to take the place of the tray 18 and be supported by the ledge 17. Either cracked ice or ice cubes, denoted by the numeral 27, may be placed in the container 26.

The closure member 9 may then be removed and in its place the various baffle plates may be inserted. The construction of this particular member is as follows: An elongated sheet of metal is bent, and has its ends welded together, in such a manner as to form the four sides of a rectangular box having an open top and bottom. This metal is denoted by the numeral 28. At the front end of this container an opening 29 is made and a small fan 30 is inserted therein and secured thereto. A plurality of baffle plates 31 are mounted on an incline therein and may be welded to either end of the container as more clearly shown in Fig. 4. The bottom plate will be secured to both ends of the container and have an opening 32 therein for the purpose of allowing drippings from the ice to drop through into the container 33 which is placed there for that purpose.

It will be noticed that as the ice absorbs heat and melts the drippings will fall on the upper baffle plate, and since each baffle plate is placed in an inclined position, the drippings will eventually reach the opening 32 and drop into the container 33. The path of the air set up by the fan 30 is denoted by the arrows in Fig. 4. This air is cooled to a certain extent on its way upwardly by passing over the cool drippings from the ice; it is further cooled as it passes the ice itself and is then allowed to escape through the openings 13 in the top 12 and out into the atmosphere thus reducing the temperature of the atmosphere surrounding said cabinet.

The tray or container 33 is provided at one end with a flange 34 which may be inserted over the shaft 35 which passes between the wheels 2. An upright extension 36 on the other end of the tray contains an opening therein whereby a key member 37, having an upturned end 38, may be inserted. The end 38 will be inserted through the opening in a downward position and then turned upwardly as shown in Fig. 4 in order to lock the container 33 in position. As the ice continues to melt and the tray 33 becomes filled with water it may be easily removed for emptying.

It will thus be seen that I have provided a cabinet which may be easily moved from room to room, and have provided in that cabinet effective means for keeping food warm during a meal, and have also provided means which may be placed in the same cabinet for the purpose of cooling the air in a room.

Other modes of applying the principle of my invention may be used instead of the one here explained, change being made as regards the structure herein described, provided the means stated by any of the following claims or the equivalent of such stated means be employed.

I therefore particularly point out and distinctly claim as my invention:

1. A portable serving cabinet having enclosing sides and ends comprising, upper and lower compartments, a removable tray having openings therein separating said compartments, closure means for enclosing only a portion of the bottom of the lower compartment, a removable tray enclosing the remainder of said bottom, an opening in said tray, and a heating unit secured to the underside thereof and covering said opening.

2. A portable serving cabinet comprising the elements defined in claim 1, combined with a plurality of individual heating units secured to the underside of said first named tray, each unit covering one of said openings.

3. A portable serving cabinet comprising, enclosing sides and ends, the closure on one side, one end and the upper portion of the other end being permanent, the closure for the lower portion of said last named end being detachably secured thereto, the other side having a horizontal door extending the full length of the cabinet to enclose the upper portion thereof and a shorter door to enclose the lower portion thereof, a removable insulated tray having openings therein covering the top of the cabinet, a second removable non-insulated tray located substantially midway between the upper and lower edges of the cabinet having a plurality of openings therein, a plurality of electric heating units secured to the bottom of said tray each covering one of said openings, a third non-insulated tray removably mounted at the bottom of the cabinet having a single opening therein, and a single electric heating unit secured to the bottom thereof and covering said opening, as and for the purposes specified.

4. A portable serving cabinet comprising, enclosing sides and ends, a removable insulated tray having openings therein covering the top of the cabinet, a second removable non-insulated tray provided with a plurality of openings and spaced below said first tray, a plurality of heating units secured to the bottom of said second tray each covering one of said openings, a third non-insulated tray removably mounted at the bottom of the cabinet having an opening therein, and an electric heating unit secured to the bottom thereof and covering said opening, as and for the purposes specified.

WILLIAM S. SHAW.